UNITED STATES PATENT OFFICE.

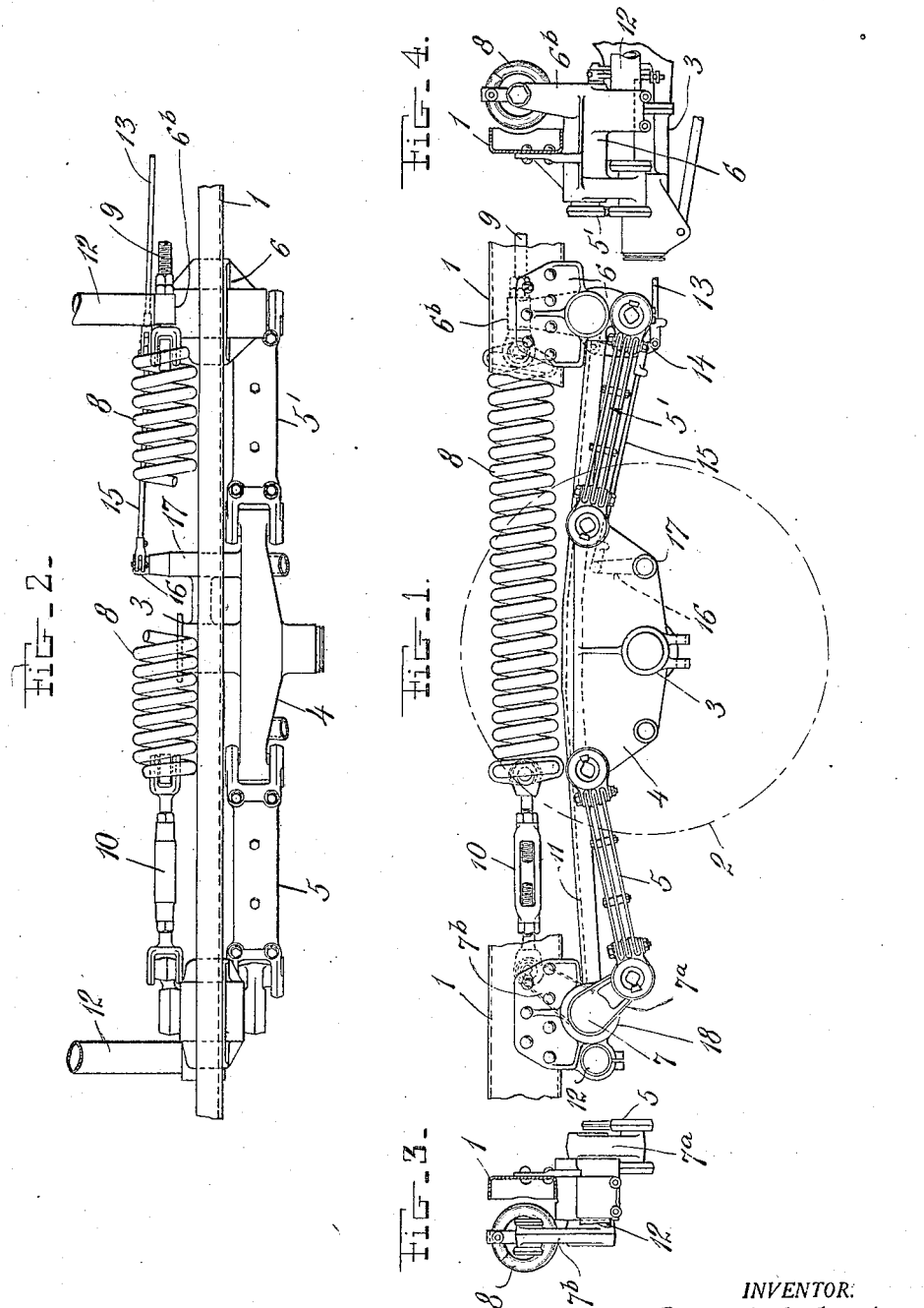

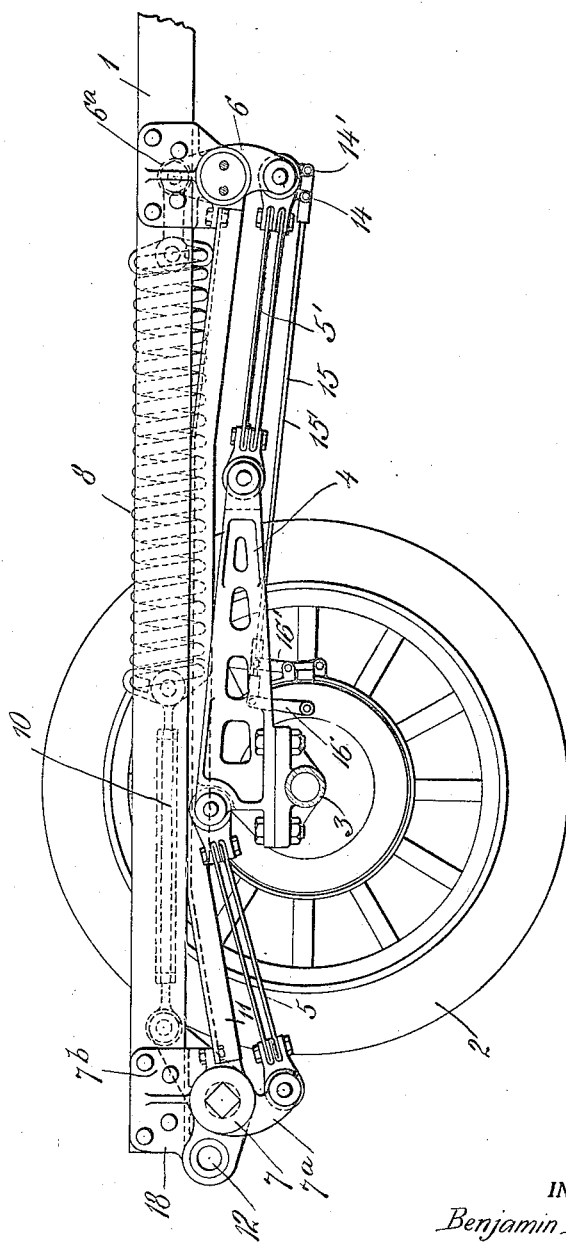

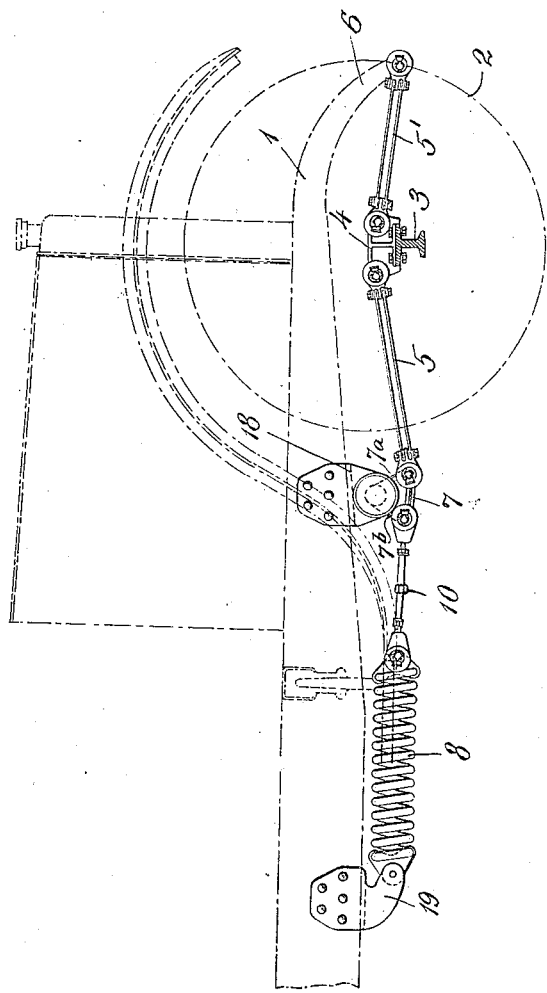

BENJAMIN LIEBOWITZ, OF NEW ROCHELLE, NEW YORK.

VEHICLE SUSPENSION.

1,422,587. Specification of Letters Patent. Patented July 11, 1922.

Application filed July 31, 1919. Serial No. 314,559.

*To all whom it may concern:*

Be it known that I, BENJAMIN LIEBOWITZ, a citizen of the United States, residing at the city of New Rochelle, county of Westchester, and State of New York, have invented certain new and useful Improvements in Vehicle Suspensions, of which the following is a specification.

My invention relates to suspensions of the type shown in my Patent No. 1,240,992, issued Sept. 25th, 1917, and in my copending application, Serial No. 93,837, filed April 27th, 1916, in which angularly movable tension members are employed to support the load, said tension members being maintained continuously under tension by a spring having a large initial strain.

The object of my invention is to provide a suspension which shall have a considerably increasing stiffness with increasing deflection; which shall have the damping friction introduced in a desired way; which shall be light in weight and have a minimum number of wearing and lubricating points; which shall take the drive and torque when applied to a rear axle; and which shall have freedom from fatigue and other advantages resulting from this type of construction.

It was shown by Wohler and verified by many subsequent investigators, that a piece of spring steel will break if subjected to a large number of applications of flexural stress of about 60,000 to 65,000 lbs. per sq. inch, the stress returning to zero after each application of the stress; and that if the stress range is over 100,000 lbs. per sq. inch, breakage will occur after a comparatively small number of repetitions. It was also shown, however, that a piece of spring steel can withstand a high stress practically indefinitely, provided that the range of stress variation is small. Wohler found in one test that a piece of spring steel could withstand practically indefinitely a stress of 132,000 lbs. per square inch, provided that the stress never fell below 88,000 lbs. per square inch, i. e., provided that the variation of stress was not more than 44,000 lbs. per square inch.

Practically all conventional springs of the leaf type are subjected to stress variations exceeding 100,000 to 125,000 lbs. per square inch, and, in accordance with Wohler's results and common experiences, must fatigue and break. In order to reduce the stress variation to ranges which would not fatigue the steel, it would be necessary to increase the weight of spring material fourfold or more, which is not only impracticable, but would cause hard riding. In my suspension, however, the stress is high, but the stress variation is substantially within the range which will not fatigue the spring material; hence fatigue is eliminated without unduly increasing the weight of spring material; and in fact, where I use helical springs, as in my present invention, the weight of spring material is usually less than half that of the corresponding conventional leaf spring.

But besides eliminating spring breakage, my invention offers a great improvement in riding qualities. It has recently been shown that if a piece of steel, which has been fatigued by repeated applications of stress, is being subjected to slow alternations of stress, and if the speed of the alternations is quickly increased, the deflection of the test specimen is momentarily decreased. These experiments therefore furnish scientific proof of the fact, stated in my patent of September 25, 1917, No. 1,240,992, and brought out by common experience, that fatigue of springs is a cause of hard riding. As brought out in said patent, my invention eliminates the effect of fatigue on the riding qualities, even if the spring element of my suspension should become somewhat fatigued. For this reason, and because of the manner in which the damping friction is introduced, and because of its increasing stiffness with increasing deflection, my invention offers a great improvement in riding.

My present invention differs from my previous suspension in that the spring element, which is carried on the frame, acts on the tension members through a bell crank, the pivot of which is made to act as a shock absorber or damper; and the arms of the bell-crank are so arranged as to cause the effective lever arm of the spring arm to increase with increasing deflections, or the effective lever arm of the tension member arms to decrease with increasing deflections, or both, whereby the tension of the tension members, and hence the stiffness of the suspension, increases with increasing deflection. This will be more fully explained in conjunction with the figures, in which:

Fig. 1 is a side elevation of one embodiment of my invention applied to the rear end of a worm or shaft driven motor truck, with part of the frame cut away to reveal the spring;

Fig. 2 is a plan view of Fig. 1, with part of the spring cut away:

Figs. 3 and 4 are fragmentary end elevations;

Fig. 5 is a side elevation of another embodiment of my invention applied to the rear end of a truck; and, Fig. 6 is a side elevation of still another embodiment applied to the front end of a passenger automobile.

Referring to Figs. 1, 2, 3 and 4, 1 is a frame of a truck, which is supposed to be carrying substantially its full load, 2 indicates the wheel, and 3 is the axle housing or axle housing extension. Rigidly fastened to 3, or cast integral therewith, is a long axle-yoke 4, pivoted to the ends of which are the tension members 5 and 5'. The outer end of tension member 5' is pivotally attached to the bracket 6 which forms a part of or is rigidly fastened to the frame 1. 7 is a bell-crank having arms 7a and 7b. The outer end of tension member 5 is pivotally attached to the arm 7a and one end of the spring 8 is pivotally attached to the arm 7b by means of turnbuckle 10. The other end of the spring is pivotally fastened to the arm 6b, which is an extension of the bracket 6, by means of the screw 9. It is to be understood that the spring 8 is subjected to a large initial strain, such as described in my Patent No. 1,240,992, so that the subsequent stresses, due to relative motion of body and axle, will come substantially within a range that will not fatigue the spring. In the present instance initial strain is applied by means of the screw 9 and the turn buckle 10. 11 is a compression brace assisting the frame in taking the thrusts due to the spring and tension members. 12—12 are cross tubes acting as cross-members.

13 is a brake operating rod, 14 the operating lever, 15 is the actuating rod, and 16 is the actuating lever. The brake cam-shaft, to which lever 16 is keyed, runs to the brakes (not shown) through the tube 17.

The bell-crank 7 is pivoted in the bracket 18 which is rigidly attached to the frame 1. The bell crank pivot employs a pivot pin somewhat smaller in diameter than the bushing in which it works, as described in my patent of June 3, 1919, No. 1,305,815, and in my application of even date herewith, so as to obtain rolling motion for small displacement, changing automatically over to sliding motion when the displacements exceed a predetermined amplitude, thereby introducing the damping friction. All the other pivots of the suspension I prefer to make of the rocker type, which is substantially free from friction and wear and requires no lubrication.

It is clear therefore that my suspension is substantially free from friction for small displacements, and hence is ideally sensitive to small shocks, and introduces the damping friction only when it is desired, viz: when the displacement becomes large.

Furthermore, the amount of friction obtained from the bell-crank pivot depends on the pressure on this pivot, and on the relative motion of the bell-crank for a given axle displacement. As the deflections of the suspension increase, both of these factors increase, particularly the ratio of bell-crank motion to axle motion; hence the friction of the suspension increases with increasing deflection. This is one of the important features of my suspension, and contributes greatly to riding comfort on rough roads.

The effective lever arms of the bell-crank arms 7a and 7b are equal to the perpendicular distances from the center of the bell-crank pivot to the axis of the tension member 5 and axis of spring 8 respectively. It will be observed that, because of the angles at which the arms 7a and 7b are set, as the deflections of the suspension increase, the effective lever arm of the tension member arm decreases, while that of the spring arm increases. Now, as in any lever, the tension of the tension member 5 is equal to the tension of the spring 8 multiplied by the ratio of the effective spring lever arm to the effective lever arm of the tension member. Hence, even though the spring tension does not increase a great deal when the deflections increase, the tension of the tension members will increase considerably. Hence my suspension is more flexible for small deflections, i. e., at light loads, and stiffens up as the deflections increase. This is another important feature of my invention, as it permits one to make my suspension more flexible than the conventional spring, without danger of "hitting bottom," and particularly because it furnishes a great increase of flexibility at light loads.

It is to be observed that this increase of stiffness with increasing deflections may be obtained either by having the tension member lever arm decrease, or the spring lever arm increase, with increasing deflections, or both. Thus, in the suspension shown in Fig. 5, the tension-member arm 7a is nearly perpendicular to the tension member 5 in the full-load position shown, hence the effective lever arm of the tension member will not change very much as the deflections change; but the spring arm 7b is approximately at 45° to the axis of the spring 8 in the full-load position shown and therefore the effective lever arm of the spring on the bell-crank pivot will suffer a considerable increase with increasing deflection; and therefore the stiffness of the suspension will increase considerably with increasing deflections even though the effective lever-arm of the tension member does not change materially.

Besides functioning as an elastic support, the rear springs of motor vehicles are frequently made to "take the drive and the torque," (the so-called Hotchkiss drive); i. e., the rear wheels' propulsion thrust is frequently imposed on the springs, and likewise the reaction of the torque which turns the rear wheels. My suspension is also designed to perform these functions, i. e., it does not require the use of radius rods or torque arms. But in order to take the torque without subjecting the axle to too great a twist, I make the axle yoke long; in fact, of about the same length as the tension members. For, it will be seen that my suspension acts as a torque spring, as well as a supporting spring, and that its flexibility as a torque spring depends on the length of the axle yoke as compared with the length of the tension members. If the axle yoke is not sufficiently long, the suspension will be too flexible as a torque spring, and the twist of the axle due to a heavy torque, as in sudden starting, will be too great.

In short, my invention is a torque-taking suspension whose torsional flexibility is adapted to the heavy torques encountered by making the axle-yoke of substantially the same length as the tension-members, or longer. But where heavy torques are not encountered, as, for example, in the case of front springs, I make the axle-yoke short, as shown in Fig. 6.

In the application of any suspension to the rear of a motor vehicle, it is essential that the motions of the axle do not materially affect the brakes. In the form of my invention shown in Figs. 1 to 4, I obtain almost perfect brake compensation by making the brake actuating rod substantially parallel to and about the same length as the tension member 5'. It will be seen that when the axle moves up and down, parallel to itself, the rod 15 and tension member 5' undergo a substantially parallelogram motion, and hence there will be no tendency to move the actuating lever 16. When the axle takes a twist about its own axis, due to the application of a heavy torque, there is a tendency to set the brakes; but in the worst case the actual motion of the lever 16 is only a degree or so, which is negligible.

It is important to note that the brake-layout shown in Figs. 1 and 2 may be considerably departed from, as in Fig. 5, and satisfactory results still may be obtained.

Referring now to Fig. 5, whose parts are numbered as in the preceding figures, the essential differences between this suspension and that already described are that the axle yoke is eccentric with respect to the rear axle, and that the rear end of the suspension is lower than the front, i. e., the suspension is tilted or "raked." This construction has several advantages; e. g., it gives a more nearly vertical path to the axle; it permits of a somewhat shorter suspension; it is a more adaptable design; etc.

It will be noted that in the suspensions shown in Fig. 1 and Fig. 5, the axis of the tension members intersect in a point considerably higher than the center of the wheel. This is of considerable advantage in that it provides fore-and-aft flexibility, even though one end of the suspension is fixed. For, the fore-and-aft shocks, acting at the wheel-center, have a movement tending to rotate the axle about the point of intersection of the axis of the tension members; and this rotation causes the axle to travel backward if this point of intersection is at a considerable distance from the wheel-center; hence the greater this distance the greater will be the fore-and-aft flexibility of the suspension.

In the suspension shown in Fig. 1 and Fig. 4, the bell-crank 7 is placed at the rear end of the suspension, but it is to be understood the bell-crank may, if desired, be put at the forward end.

Referring now to Fig. 6, which shows my suspension applied to the front end of a passenger car, the only important difference between this embodiment and those preceding, besides the short axle yoke already mentioned, is that the spring is placed in the same plane as the tension members, i. e., directly under the frame, and the bell-crank arm $7^b$ is accordingly reversed. The rear end of the spring is fastened to the bracket 19; the other elements of this figure are numbered as in the preceding figures. In this case, as in that shown in Fig. 1, the bell-crank levers $7^b$ and $7^a$ are set at such angles as to cause an increase in the ratio of their effective lever-arms with increasing deflection, so as to cause the suspension to increase in stiffness with increasing deflection as previously described.

What I claim is:

1. In a vehicle suspension, a bell crank, a spring having one end fixed to the frame and the other end connected to an arm of the crank, an axle yoke, and a pair of tension members, one connecting the other arm of the crank with the axle yoke, and the other connecting the axle yoke with the frame, the point of attachment of the one tension member to the frame being higher than the point of attachment of the other tension member to the bell crank arm.

2. In a vehicle suspension, a bell crank carried by the frame, an initially strained spring in which the subsequent stress variations due to relative displacements of body and axle are substantially within the non-fatiguing range of the spring material, said spring having one end fixed to the frame and having the other end connected with an arm of the crank, a tension member connecting the other arm of the crank with the axle, and a second tension member connecting the axle with the frame.

3. In a vehicle suspension, a pivoted bell crank carried by the frame the pivot whereof acts as a frictional shock absorber, an initially strained spring in which the subsequent stress variations due to relative displacements of body and axle are substantially within the non-fatiguing range of the spring material, said spring having one end fixed to the frame and the other end connected with an arm of the crank, a tension member connecting the other arm of the crank with the axle, and a second tension member connecting the axle with the frame.

4. In a vehicle suspension, a bell crank carried by the frame, an initially strained spring having one end fixed to the frame and having the other end connected with an arm of the crank, said arm being disposed so that the effective leverage thereof increases with increasing deflections of the suspension, a tension member connecting the other arm of the crank with the axle.

5. In a vehicle suspension, a bell crank carried by the frame, an initially strained spring having one end fixed to the frame and having the other end connected with an arm of the crank, a tension member connecting the other arm of the crank with the axle, said last mentioned crank arm being disposed so that the effective leverage thereof decreases with increasing deflections of the suspension, and a second tension member connecting the axle with the frame.

6. In a vehicle suspension, a bell crank carried by the frame, an initially strained spring having one end fixed to the frame and the other end connected with an arm of the crank, an axle yoke, a tension member connecting one end of the yoke with the other arm of the crank, and a second tension member connecting the other end of the yoke with the frame, said yoke being substantially as long as, or longer than, either of the tension members.

7. In a vehicle suspension of the character described, torque taking means including an axle yoke, a pair of tension members pivotally connected to the axle yoke, said yoke being substantially as long as, or longer than, either of the tension members, and an initially strained spring maintaining said parts continuously under tension.

BENJAMIN LIEBOWITZ.